United States Patent
Fujita et al.

(10) Patent No.: US 8,351,345 B2
(45) Date of Patent: Jan. 8, 2013

(54) BASE STATION APPARATUS, UPLINK SINR MEASURING METHOD, UPLINK SCHEDULING METHOD, AND RECEPTION-QUALITY MEASURING METHOD

(75) Inventors: Hiroshi Fujita, Kawasaki (JP); Makoto Yoshida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 331 days.

(21) Appl. No.: 12/696,809

(22) Filed: Jan. 29, 2010

(65) Prior Publication Data

US 2010/0128627 A1 May 27, 2010

Related U.S. Application Data

(63) Continuation of application No. PCT/JP2007/065377, filed on Aug. 6, 2007.

(51) Int. Cl.
*H04L 12/00* (2006.01)
(52) U.S. Cl. .......................... 370/252; 370/310; 455/296
(58) Field of Classification Search .................. 370/252, 370/253, 241, 208, 332, 310, 248, 329; 455/509, 455/450, 39, 296; 375/346
See application file for complete search history.

(56) References Cited

U.S. PATENT DOCUMENTS

| | | | |
|---|---|---|---|
| 6,154,450 A * | 11/2000 | Wallentin et al. | 370/311 |
| 6,366,763 B1 | 4/2002 | Ue | |
| 7,072,315 B1 | 7/2006 | Liu | |
| 7,133,688 B2 | 11/2006 | Das et al. | |
| 7,860,198 B2 | 12/2010 | Montalbano | |
| 2005/0018613 A1 | 1/2005 | Yokota | |
| 2006/0072498 A1 | 4/2006 | Kent et al. | |
| 2006/0221847 A1 * | 10/2006 | Dacosta | 370/252 |
| 2006/0285505 A1 | 12/2006 | Cho et al. | |
| 2007/0129096 A1 * | 6/2007 | Okumura et al. | 455/522 |
| 2007/0140276 A1 | 6/2007 | Yokota | |
| 2007/0155323 A1 | 7/2007 | Matsumoto | |
| 2007/0202904 A1 | 8/2007 | Cheng et al. | |
| 2009/0196192 A1 * | 8/2009 | Lim et al. | 370/252 |

FOREIGN PATENT DOCUMENTS

| | | |
|---|---|---|
| CN | 1770659 A | 5/2006 |
| EP | 0986282 | 3/2000 |
| EP | 1482752 | 12/2004 |
| EP | 1734705 | 12/2006 |
| JP | 2000-049663 | 2/2000 |
| JP | 2002077983 | 3/2002 |
| JP | 2003318821 A | 11/2003 |
| JP | 2004523934 | 8/2004 |
| JP | 2004357213 | 12/2004 |
| JP | 2005223474 A | 8/2005 |

(Continued)

OTHER PUBLICATIONS

Korean Intellectual Property Office Notice of Preliminary Rejection dated Feb. 17, 2011, from Korean Patent Application No. 10-2010-7001017.

(Continued)

*Primary Examiner* — Gary Mui
(74) *Attorney, Agent, or Firm* — Murphy & King, P.C.

(57) ABSTRACT

A base station apparatus includes a receiving unit that receives a control signal having predetermined patterns for performing communication control processing at the base station; and a measuring unit that measures SINR of reception data that is obtained from the control signal received by the receiving unit.

8 Claims, 9 Drawing Sheets

FOREIGN PATENT DOCUMENTS

| | | |
|---|---|---|
| JP | 2005244958 | 9/2005 |
| JP | 2006067001 A | 3/2006 |
| JP | 2006-270788 A | 10/2006 |
| JP | 2006295842 A | 10/2006 |
| JP | 2006352894 | 12/2006 |
| JP | 2007158721 | 6/2007 |
| KR | 10-20060132422 | 12/2006 |
| WO | 99/55112 | 10/1999 |
| WO | 2004028187 A1 | 4/2004 |
| WO | 2005089006 A1 | 9/2005 |
| WO | 2005099163 A1 | 10/2005 |
| WO | 2006104596 A2 | 10/2006 |

OTHER PUBLICATIONS

Japanese Notice of Rejection dated Sep. 20, 2011 issued in 2009-526286.
IEEE Std 802.16e™-2005 and IEEE Std 802.16™-2004/Cor1-2005, Part 16: Air Interface for Fixed and Mobile Broadband Wireless Access Systems.
International Search Report received in corresponding PCT/JP2007/065377 dated Oct. 23, 2007.
English Translation of International Preliminary Report on Patentability dated Apr. 1, 2010 received in corresponding International Application No. PCT/JP2007/065377.
Japanese International Preliminary Report on Patentability dated Feb. 18, 2010 received in corresponding International Application No. PCT/JP2007/065377.
Japanese Office Action dated Jan. 17, 2012 issued in application No. 2009-526286.
Extended European Search Report dated Oct. 30, 2012 received in Application No. 07792047.8-2412.
Ericsson "Uplink macro-diversity for E-UTRA—Additional Results" 3GPP Draft; R3-050942; vol. RAN WG3, no. London, UK; 20050825, Aug. 25, 2005, XP050158372, [retrieved on Aug. 25, 2005].
Viswanathan H et al. "Optimizing the ARQ Performance in Downlink Packet Data Systems with Scheduling" vol. 4, No. 2, Mar. 1, 2005 pp. 495-506, XP011129329.
Chinese Partial Translation of Second Office Action dated Oct. 19, 2012 received in Application No. 200780053804.6.

* cited by examiner

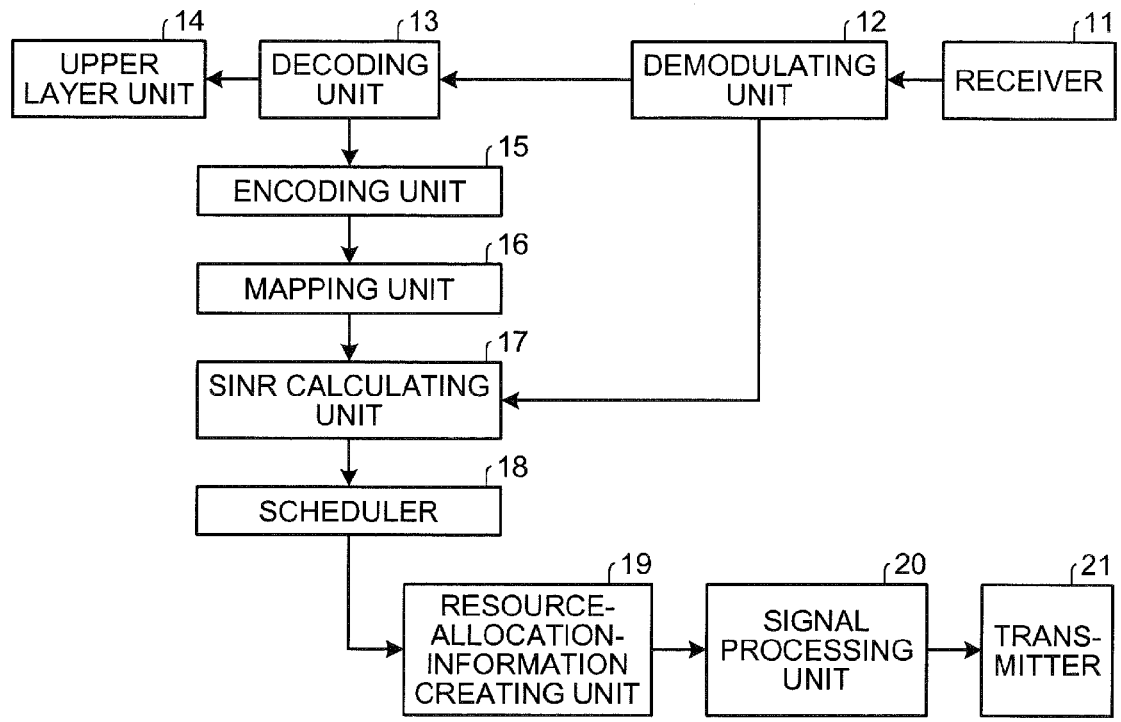
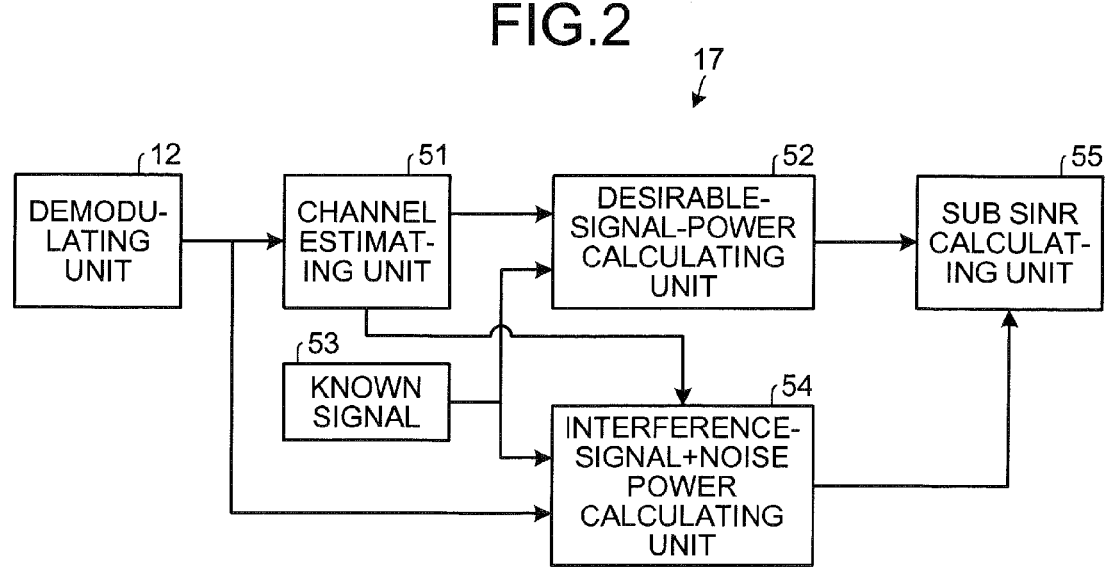

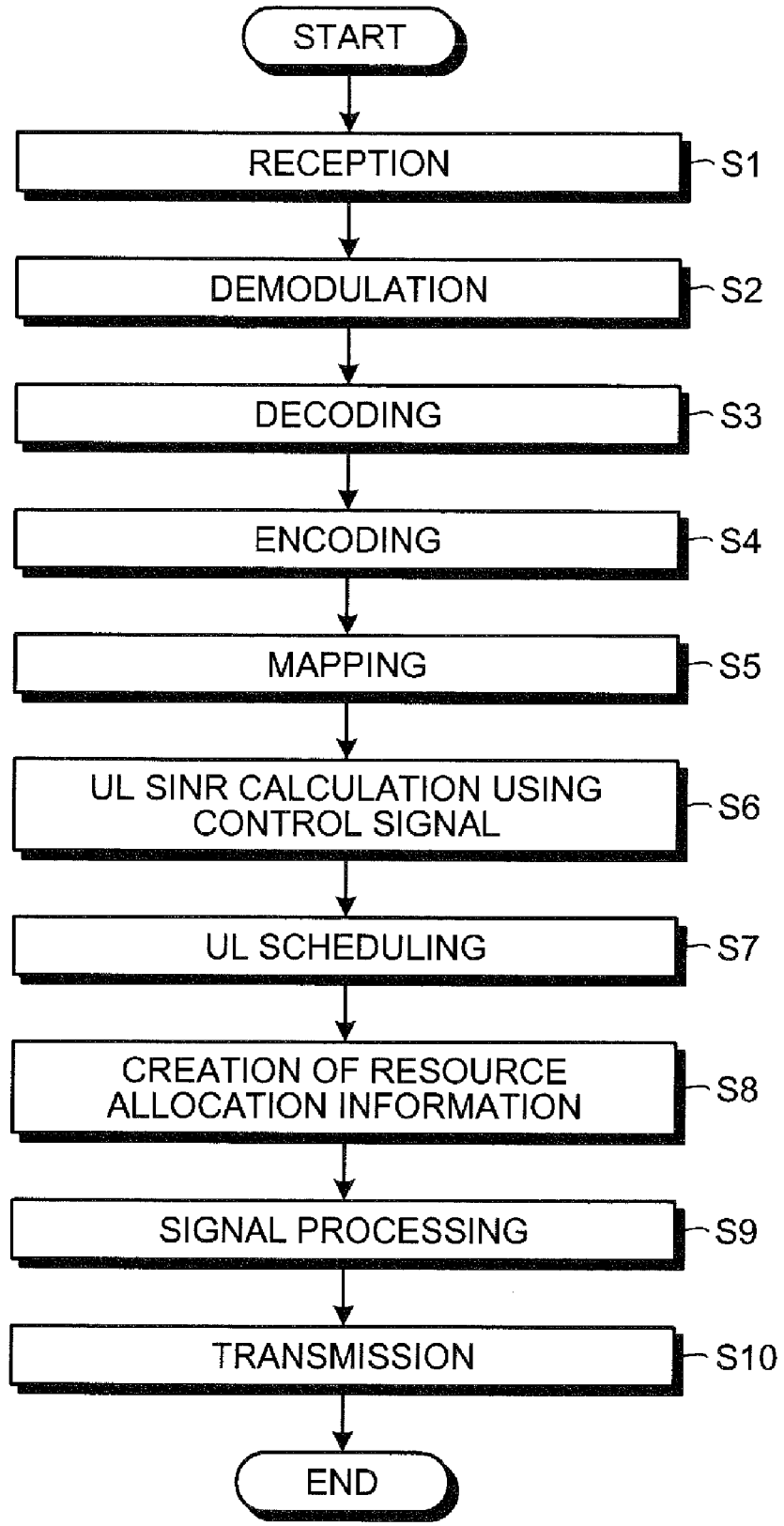

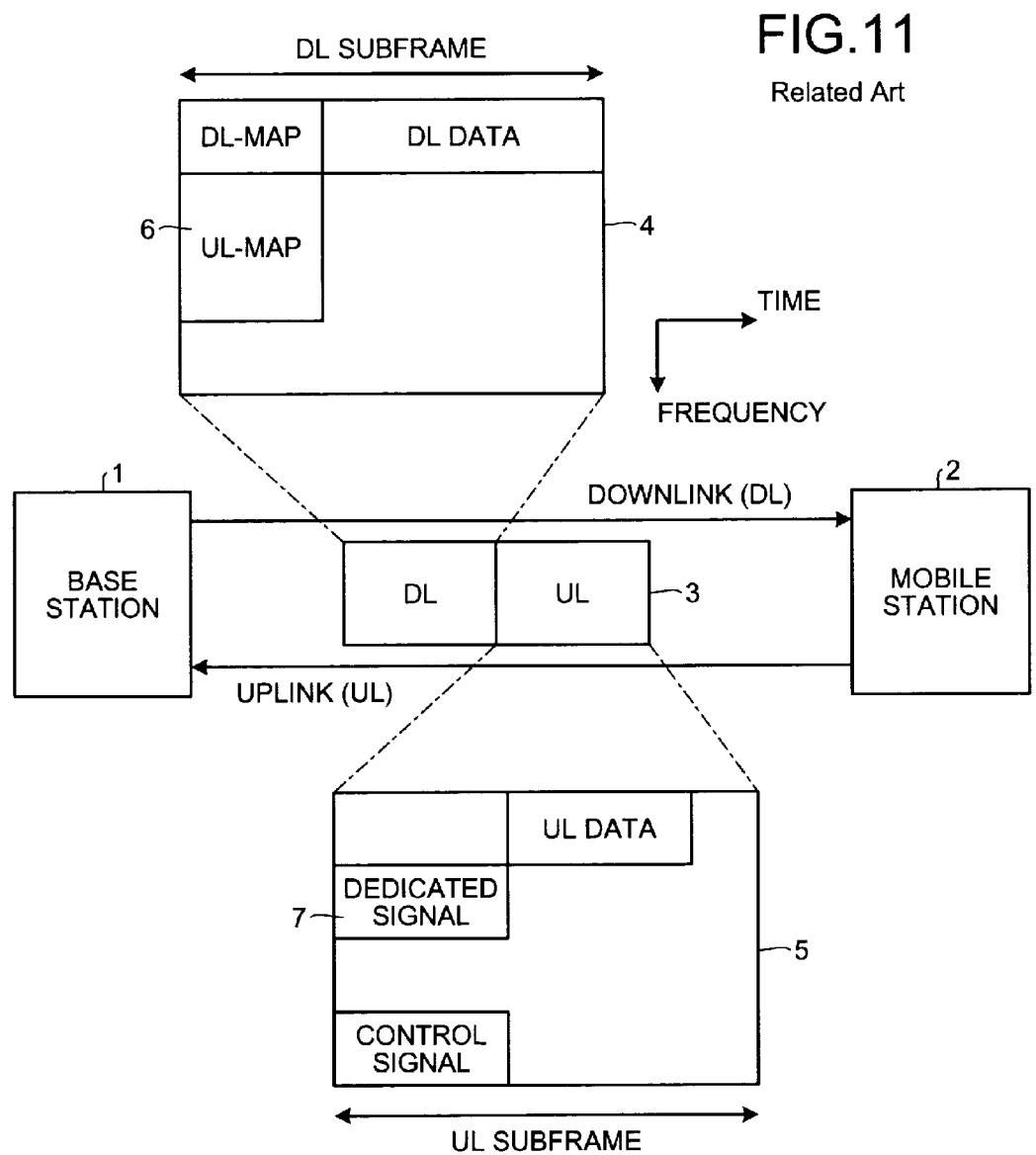

BASE STATION APPARATUS, UPLINK SINR MEASURING METHOD, UPLINK SCHEDULING METHOD, AND RECEPTION-QUALITY MEASURING METHOD

FIELD

The embodiments discussed herein are related to a base station apparatus, an uplink SINR measuring method, an uplink scheduling method, and a reception-quality measuring method.

BACKGROUND

In mobile wireless communication systems, wireless uplink resources from a mobile station to a base station are sometimes allocated based on SINR (signal-to-interface and noise ratio) of signals to be transmitted from the mobile station to the base station. At allocation, a scheduler of the base station acquires uplink SINR of a user, and allocates wireless resources to the user based on the acquired SINR.

When frequency scheduling is performed in OFDMA (orthogonal frequency division multiple access) systems, a scheduler of the base station uses the uplink SINR of each frequency block. A link and SINR from a mobile station to a base station are referred to as an uplink (UL) and uplink SINR, respectively. Further, the direction toward a mobile station from the base station is referred to as a downlink direction, and a link in a downlink direction is referred to as a downlink (DL).

For OFDMA systems adopting IEEE802.16e standards, one example of mobile wireless communication standards, there is no provision regarding a method of measuring uplink SINR (for example, refer to IEEE Std 802.16e-2005 and IEEE Std 802.16-2004/Cor 1-2005 (US)). Generally, SINR is measured using a unique signal or series of signals dedicated therefor. For example, a pilot subcarrier signal or a ranging signal is used, or a sounding signal is used (for example, refer to Japanese National Publication of International Patent Application No. 2004-523934 (paragraph number [0017])). Moreover, a method of determining the condition of a downlink propagation path by transmitting ACK/NACK information on a pilot signal to a base station from a mobile station in an OFDMA-TDD (time division duplex) system has conventionally been proposed (for example, refer to Japanese Laid-open Patent Publication No. 2005-244958 (paragraph numbers [0041] and [0043])).

FIG. 11 is a view for explaining a conventional uplink SINR measuring method. As depicted in FIG. 11, a transmission/reception frame 3 of OFDMA is constituted by a downlink subframe 4 and an uplink subframe 5. Conventionally, when the pilot subcarrier described above or the like is used as a signal for uplink SINR measurement, a base station 1 uses MAP information (UL-MAP) 6 of the downlink subframe 4 to notify a mobile station 2 of the wireless resources to be used for uplink SINR measurement such as timing and frequency blocks.

The mobile station 2, using the wireless resources indicated by the base station 1, transmits a signal for uplink SINR measurement to the base station 1. This signal for uplink SINR measurement is stored in a dedicated signal area 7 of the uplink subframe 5 to be transmitted. The base station 1 measures uplink SINR using the received signal for uplink SINR measurement. The base station 1 performs scheduling for uplinks based on a result of uplink SINR measurement and notifies the mobile station 2 using the uplink MAP information 6. The mobile station 2 transmits uplink data (UL data) to the base station 1 using accordingly the wireless resources indicated by the base station 1.

However, in the above methods using a pilot subcarrier, ranging signal, or sounding signal, because the base station, using a downlink, notifies a mobile station of wireless resources for uplink SINR measurement, and the mobile station transmits a signal for uplink SINR measurement to the base station using the wireless resources, there is a problem in that this strains uplink and downlink resources. Furthermore, when frequency scheduling is performed, the uplink SINR measurement is performed for each frequency block, and signals for uplink SINR measurement are required for the respective frequency blocks, further straining resources.

SUMMARY

According to an aspect of an embodiment, a base station apparatus includes a receiving unit that receives a control signal having predetermined patterns for performing communication control processing at the base station; and a measuring unit that measures SINR of reception data that is obtained from the control signal received by the receiving unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 is a diagram of a configuration of a base station apparatus according to a first embodiment of the present invention.

FIG. 2 is a diagram of a configuration of an SINR calculating unit according to the first embodiment.

FIG. 3 is a flowchart of operations at SINR measurement by the base station apparatus according to the first embodiment.

FIG. 11 is a view for explaining a conventional uplink SINR measuring method.

DESCRIPTION OF EMBODIMENTS

Figure 4:
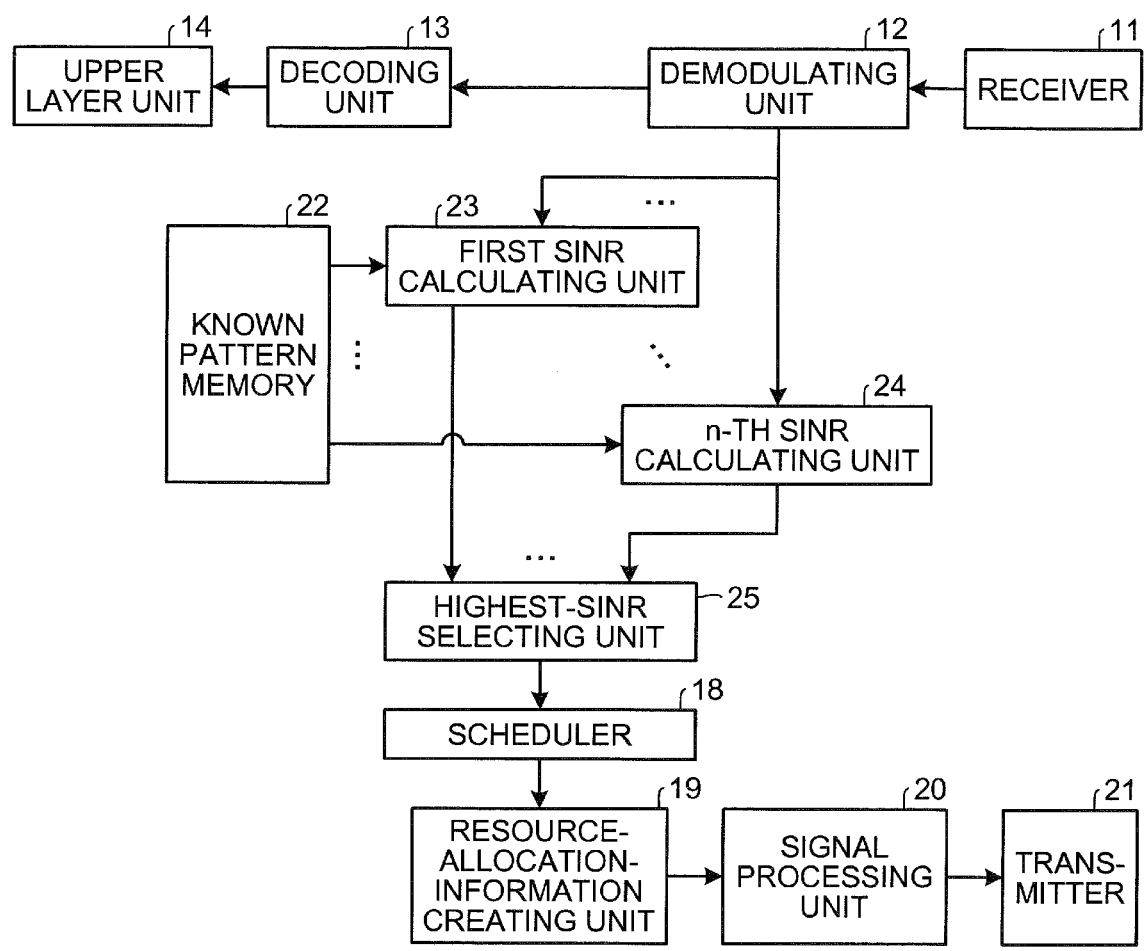
FIG. 4 is a diagram of a configuration of a base station apparatus according to a second embodiment of the present invention.

Preferred embodiments of the present invention will be explained with reference to the accompanying drawings. The present invention is not limited by the embodiments.

FIG. 1 is a diagram of a configuration of a base station apparatus according to a first embodiment. As depicted in FIG. 1, the base station apparatus includes a receiver 11, a demodulating unit 12, a decoding unit 13, an upper layer unit 14, an encoding unit 15, a mapping unit 16, an SINR calculating unit 17, a scheduler 18, a resource-allocation-information creating unit 19, a signal processing unit 20, and a transmitter 21.

The receiver 11 receives signals transmitted from a mobile station, not depicted. The mobile station transmits a control signal for communication control processing at the base station, data, and the like. The base station apparatus performs normal communication control processing based on the control signal which has given patterns, such as an ACK signal and a NACK signal transmitted from the mobile station, and performs uplink SINR measurement using the control signal. For example, when types of control signals that are expected to be received at a given timing are limited to given types (C1 to CN), the type (Ci) of the control signal most similar to (including matching) the received signal is identified, and the identified type (Ci) is used as a reference signal.

For example, when reception of a response to transmitted data is expected, the limited given patterns of an ACK signal and a NACK signal are, for example "0" and "1". In this specification, a control signal is a signal that is used for communication control processing at the base station, a signal to perform the uplink SINR measurement, and a signal that has limited given patterns, unless otherwise specified.

The demodulating unit 12, the decoding unit 13, the encoding unit 15, the mapping unit 16, and the SINR calculating unit 17 constitute a measuring unit that measures SINR for reception data that is obtained from a control signal received by the receiver 11. The demodulating unit 12 demodulates a signal received by the receiver 11. The data demodulated by the demodulating unit 12 may have an error depending on the condition of the uplink propagation path. The decoding unit 13 decodes the data demodulated by the demodulating unit 12, and corrects errors. The encoding unit 15 encodes the control signal pattern identified by the decoding unit 13 again by the same encoding scheme used for the control signal, and the mapping unit 16 maps the re-encoded data by the same mapping scheme used for the control signal. If there is no match with an expected given pattern even after error correction is performed, the most similar pattern among expected pattern candidates is used as the decoded data. For example, if 0100 is received even though either one of two types of signals C1 (0011) and C2 (1100) is expected to be received as a control signal, because C2 is more similar than C1, C2 is used as the decoded data to perform re-encoding and mapping.

The SINR calculating unit 17 compares the data demodulated by the demodulating unit 12 and the data mapped by the mapping unit 16, to calculate SINR. The data mapped by the mapping unit 16 is to be data of a known pattern. By comparing the data demodulated by the demodulating unit 12 and this known pattern, the condition of the uplink propagation path can be estimated. Moreover, for SINR calculation at this time, for example, a scheme similar to the conventional scheme may be used such as that depicted in FIG. 2. The demodulating unit 12 obtains an IQ signal having amplitude fluctuation and phase fluctuation. A channel estimating unit 51 calculates an IQ signal obtained by removing the amplitude fluctuation and the phase fluctuation from the signal. Subsequently, a desirable-signal-power calculating unit 52 multiplies the signal with a known signal pattern 53 to calculate desirable signal power. Furthermore, an interference-signal-power calculating unit (interference-signal+noise power calculating unit depicted in FIG. 2) 54 calculates the power of an interference signal obtained by subtracting the desirable signal from the received signal subjected to demodulation. Next, a sub SINR calculating unit 53 calculates SINR by ratioing the desirable signal power and the interference signal power. In the present embodiments, the known signal pattern 53 is obtained from the mapping unit 16.

The scheduler 18 performs scheduling of the uplink based on uplink SINR information obtained from the SINR calculating unit 17. The resource-allocation-information creating unit 19 creates resource allocation information based on the uplink scheduling by the scheduler 18. The signal processing unit 20 performs encoding processing and modulation processing on data, such as the resource allocation information, to be transmitted to the mobile station. The transmitter 21 transmits an output signal of the signal processing unit 20 to the mobile station.

Moreover, the control signal received by the receiver 11 is demodulated and decoded by the demodulating unit 12 and the decoding unit 13, respectively, to be sent to the upper layer unit 14. The upper layer unit 14 performs control processing for communication based on the control information sent from the decoding unit 13.

FIG. 3 is a flowchart of operations at SINR measurement by the base station apparatus according to the first embodiment. As depicted in FIG. 3, first, the receiver 11 receives a control signal transmitted from a mobile station (step S1). Next, the demodulating unit 12 demodulates the control signal (step S2). Subsequently, the decoding unit 13 decodes the demodulated data (step S3). The encoding unit 15 then re-encodes the decoded data (step S4). Next, the mapping unit 16 maps the re-encoded data into an IQ signal (step S5). Subsequently, the SINR calculating unit 17 compares the data demodulated by the demodulating unit 12 and the data mapped into the IQ signal by the mapping unit 16, to calculate SINR (step S6).

The scheduler 18 then performs scheduling of the uplink based on the result of SINR calculation (step S7). Next, the resource-allocation-information creating unit 19 creates resource allocation information to be notified to the mobile station based on the uplink scheduling (step S8). Subsequently, the signal processing unit 20 performs signal processing such as encoding and modulation on data such as the resource allocation information (step S9). The transmitter 21 then transmits the resource allocation information subjected to the signal processing to the mobile station (step S10).

FIG. 4 is a diagram of a configuration of a base station apparatus according to a second embodiment. As depicted in FIG. 4, the second embodiment differs from the first embodiment in that the SINR measuring unit is constituted by the demodulating unit 12, a known pattern memory 22, n units of a first to an n-th SINR calculating unit 23, 24, and a highest-SINR selecting unit 25. n is a positive integer of 2 or greater. Other components are identical to those in the first embodiment. Thus, in the second embodiment, components identical to those in the first embodiment are indicated by the same reference characters used in the first embodiment, and explanation therefor is omitted.

The known pattern memory 22 stores n items of known pattern data used at SINR measurement. The first SINR calculating unit 23 compares data demodulated by the demodulating unit 12 and a first known pattern data stored in the known pattern memory 22, to calculate SINR. The n-th SINR calculating unit 24 compares data demodulated by the demodulating unit 12 and n-th known pattern data stored in the known pattern memory 22, to calculate SINR. Thus, in the second embodiment, data decoded by the decoding unit 13 is not used as known pattern data for SINR measurement.

A second known pattern data to an [n−1]-th known pattern data are also processed similarly. In FIG. 4, depiction of a second to an [n−1]-th SINR calculating units is omitted. SINR values obtained by the respective SINR calculating units 23, 24 are temporary values. The highest-SINR selecting unit 25 selects the highest value from the n temporary SINR values obtained by the n units of the SINR calculating units 23, 24. The highest SINR value selected by the highest-SINR selecting unit 25 is given to the scheduler 18 as uplink SINR information.

Figure 5:
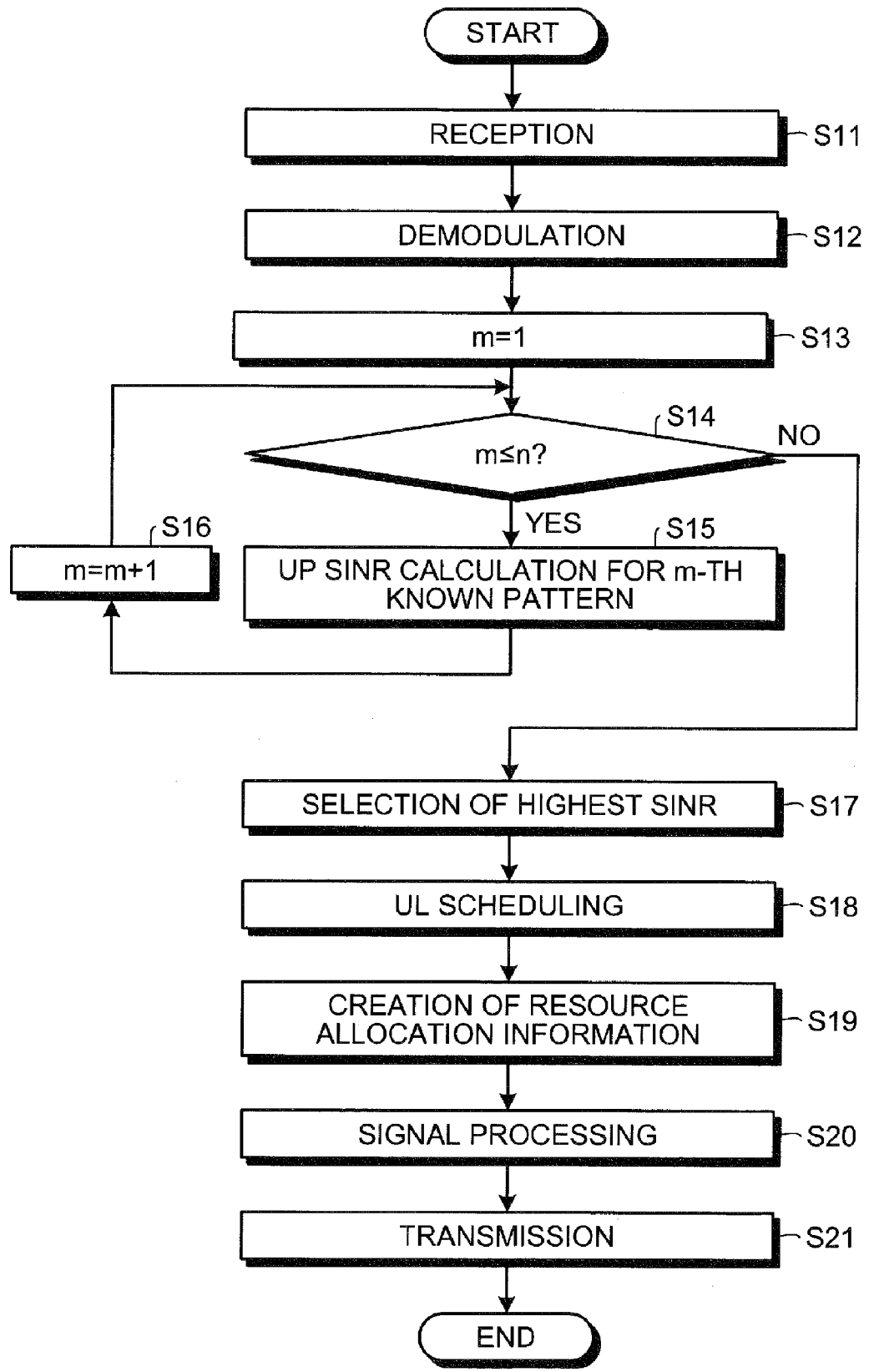
FIG. 5 is a flowchart of operations at SINR measurement by the base station apparatus according to the second embodiment.

FIG. 5 is a flowchart of operations at SINR measurement by the base station apparatus according to the second embodiment. As depicted in FIG. 5, reception of a control signal from a mobile station (step S11) and demodulation of the control signal (step S12) are identical to operations at step S1 and step S2 of the first embodiment and after which, a value of m is set to 1 (step S13). m is a positive integer equal to or less than n. It is then determined whether the value of m is at most the value of n (step S14). The value of n indicates the number of known pattern data stored in the known pattern memory 22.

Initially, because m is 1, the value of m is equal to or less than n (step S14: YES). Therefore, the first SINR calculating unit 23 compares the data demodulated by the demodulating unit 12 with the first known pattern data stored in the known pattern memory 22, to calculate a temporary first SINR (step S15). The value of m is then incremented by 1 (step S16), and it is determined whether the value of m is at most the value of n again (step S14).

Operations at step S14 to step S16 are repeated until the value of m becomes equal to the value of n, and the m-th SINR calculating unit compares the data demodulated by the demodulating unit 12 with an m-th known pattern stored in the known pattern memory 22, to calculate a temporary m-th SINR. When the value of m becomes larger than the value of n (step S14: NO), the highest-SINR selecting unit 25 selects the highest value from among the obtained n temporary SINR values (step S17).

Based on the highest SINR value, scheduling of the uplink is performed (step S18), resource allocation information is created (step S19), signal processing is performed (step S20), and the resource allocation information is transmitted to the mobile station (step S21). Operations at step S18 to step S21 are identical to those at step S5 to step S8 of the first embodiment.

Figure 6:
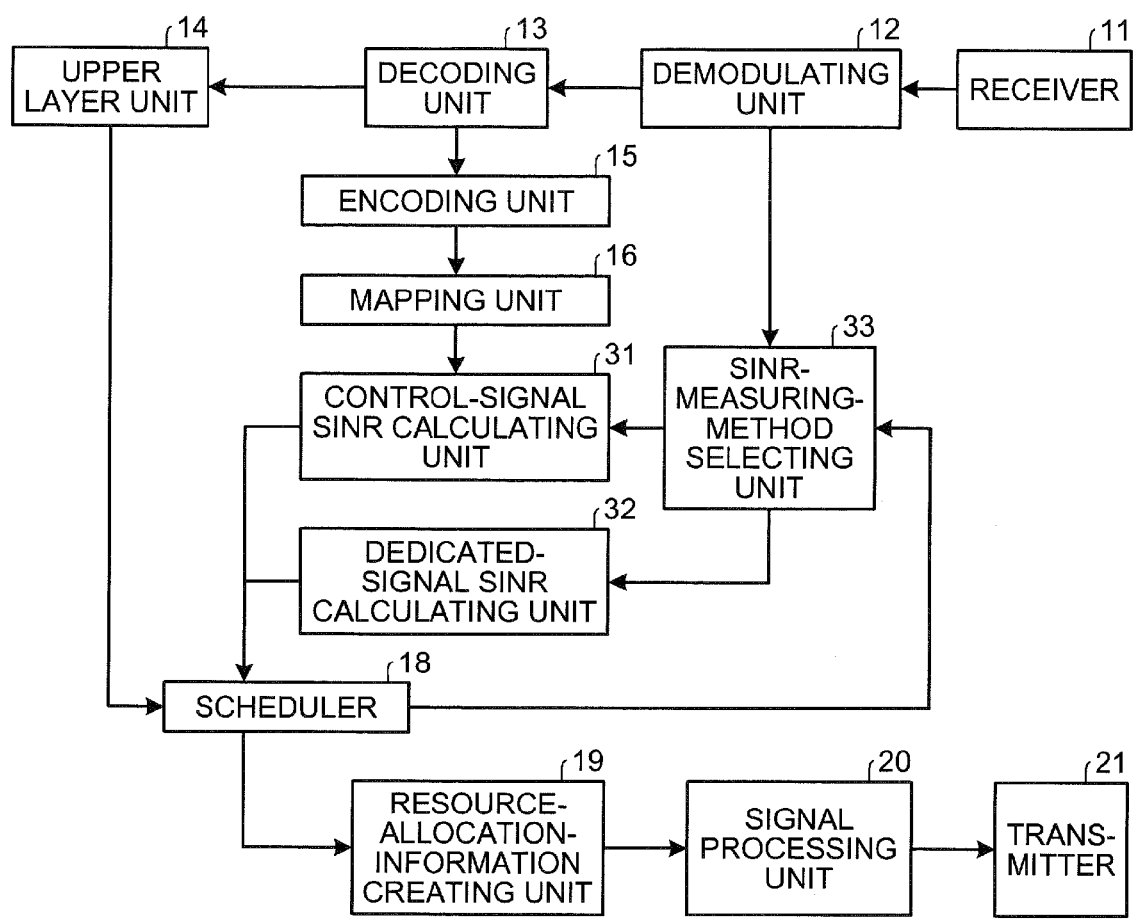
FIG. 6 is a diagram of a configuration of a base station according to a third embodiment of the present invention.

FIG. 6 is a diagram of a configuration of a base station according to a third embodiment. As depicted in FIG. 6, the third embodiment differs from the first embodiment in that the SINR measuring unit is constituted by the demodulating unit 12, the decoding unit 13, the encoding unit 15, the mapping unit 16, a control-signal SINR calculating unit 31, a dedicated-signal SINR calculating unit 32, and an SINR-measuring-method selecting unit 33. Other components are identical to those in the first embodiment. Thus, in the third embodiment, components identical to those in the first embodiment are indicated by the same reference characters used in the first embodiment, and explanation therefor is omitted.

The scheduler 18 receives application information from the upper layer unit 14, and notifies the SINR-measuring-method selecting unit 33 whether a control signal (an ACK signal, a NACK signal, etc.) having limited given patterns as in the first embodiment, is to be received from a mobile station. If the SINR-measuring-method selecting unit 33 receives notification that such a control signal is to be sent, the SINR-measuring-method selecting unit 33 transfers a demodulated signal of the control signal from the demodulating unit 12 to the control-signal SINR calculating unit 31.

If the SINR-measuring-method selecting unit 33 receives notification that such a control signal is not to be sent, the SINR-measuring-method selecting unit 33 transfers a demodulated signal of a dedicated signal for uplink SINR measurement from the demodulating unit 12 to the dedicated-signal SINR calculating unit 32. The control-signal SINR calculating unit 31 compares, similarly to the first embodiment, the demodulated signal of the control signal and the signal decoded by the decoding unit 13, re-encoded by the encoding unit 15, and mapped into an IQ signal by the mapping unit 16, to calculate SINR.

The dedicated-signal SINR calculating unit 32 compares, similarly to the conventional technique, the demodulated signal of the dedicated signal and the known pattern data, to calculate SINR. This dedicated signal is received by the receiver 11 and demodulated by the demodulating unit 12. SINR information is given to the scheduler 18 from the control-signal SINR calculating unit 31 or the dedicated-signal SINR calculating unit 32.

Figure 7:
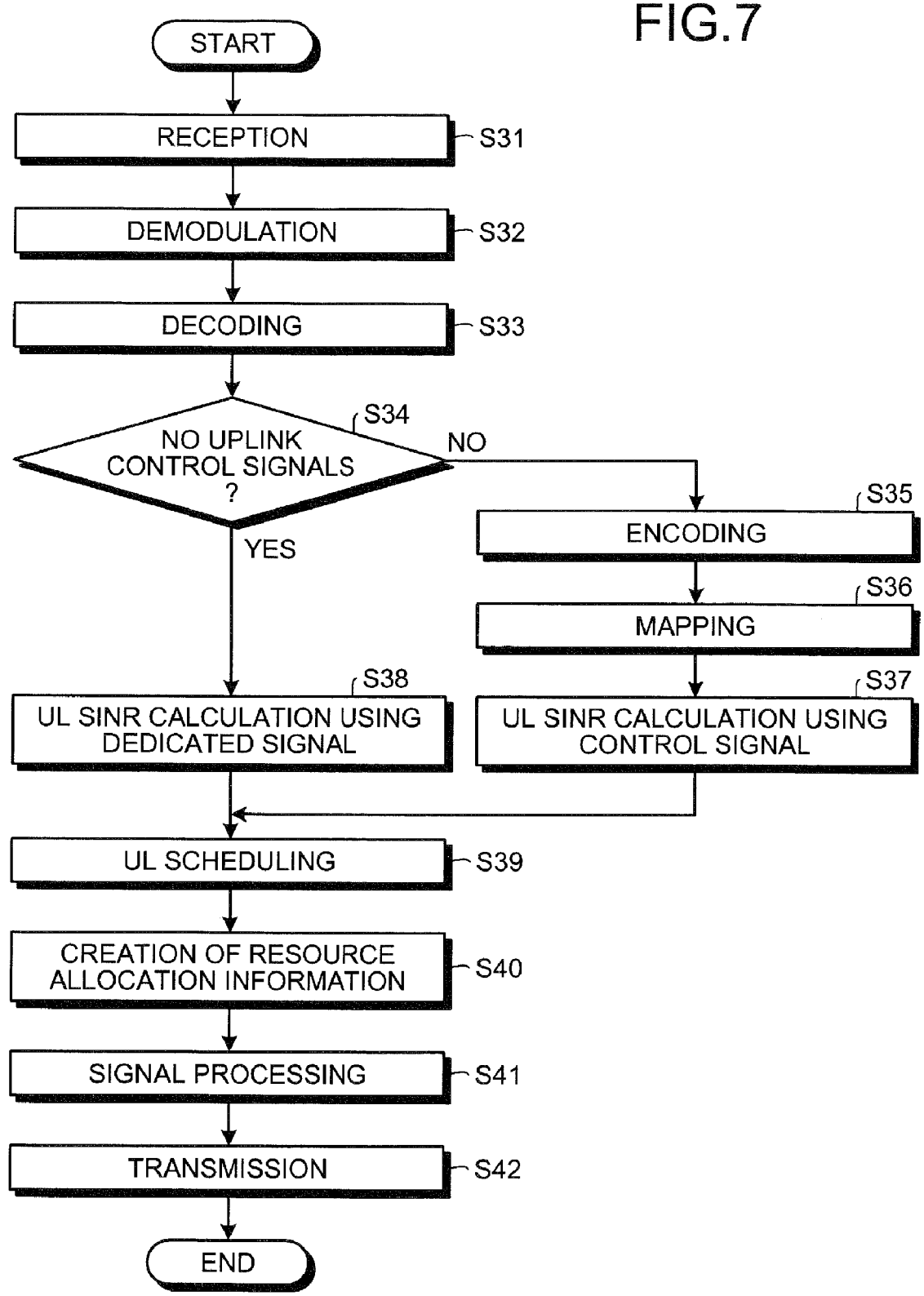
FIG. 7 is a flowchart of operations at SINR measurement by the base station apparatus according to the third embodiment.

FIG. 7 is a flowchart of operations at SINR measurement by the base station apparatus according to the third embodiment. As depicted in FIG. 7, reception of a control signal from a mobile station (step S31), demodulation of the control signal (step S32), and decoding thereof (step S33) are identical to the operations at step S1, step S2, and step S3 of the first embodiment, after which the scheduler 18 and the SINR-measuring-method selecting unit 33 determine whether a control signal to perform uplink SINR measurement is present (step S34).

When the control signal is present (step S34: NO), the decoded data is re-encoded (step S35) and mapped into an IQ signal (step S36), to be sent to the control-signal SINR calculating unit 31. The control-signal SINR calculating unit 31 calculates uplink SINR using the control signal (step S37). When the control signal is not present (step S34: YES), the dedicated-signal SINR calculating unit 32 calculates uplink SINR using the dedicated signal (step S38). Scheduling of the uplink is then performed based on the calculated SINR (step S39), resource allocation information is created (step S40), signal processing is performed (step S41), and the resource allocation information is transmitted to the mobile station (step S42). Operations at step S39 to step S42 are identical to those at step S7 to step S10 of the first embodiment.

As described, in the third embodiment, an uplink SINR measuring function using a dedicated signal similar to a conventional technique is added to the base station apparatus of the first embodiment. The uplink SINR measuring function using a dedicated signal that is similar to a conventional technique can be added to the base station apparatus of the second embodiment.

Figure 8:
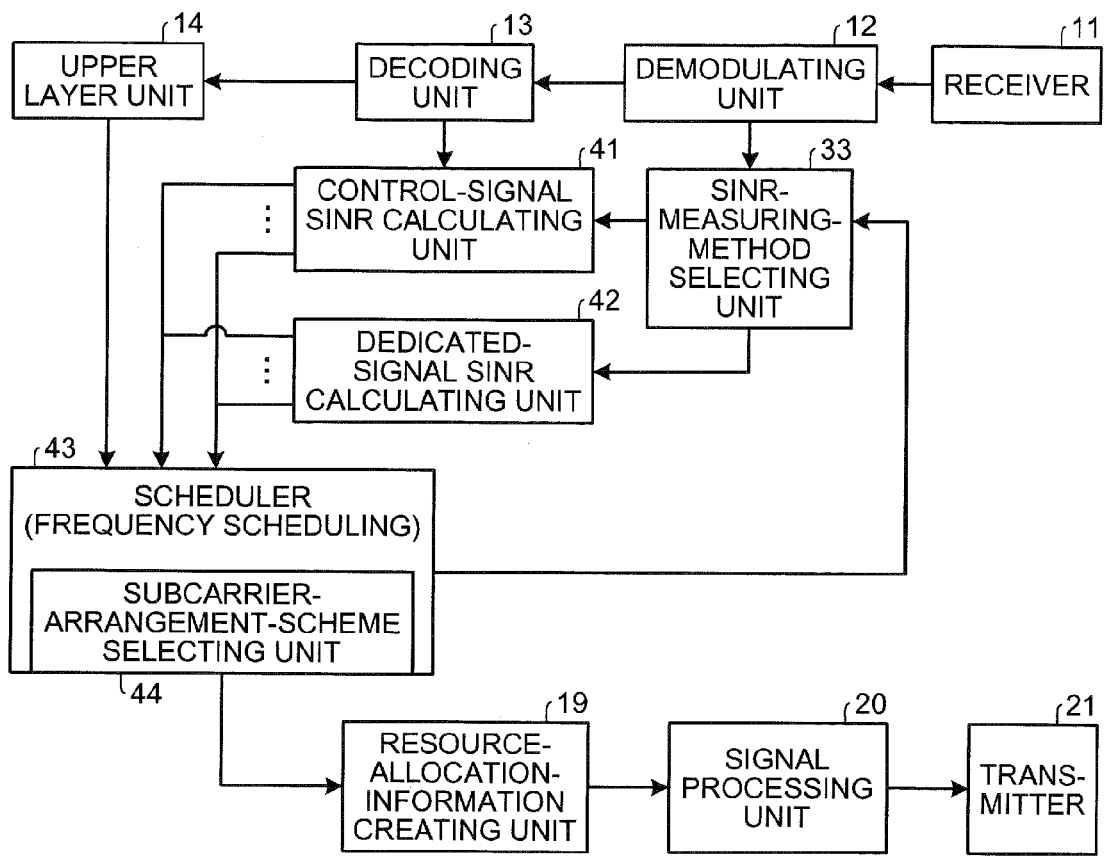
FIG. 8 is a diagram of a configuration of a base station apparatus according to a fourth embodiment of the present invention.

FIG. 8 is a diagram of a configuration of a base station apparatus according to a fourth embodiment. As depicted in FIG. 8, the fourth embodiment is configured to perform frequency scheduling under the third embodiment. Therefore, a control-signal SINR calculating unit 41 and a dedicated-signal SINR calculating unit 42 measure SINR for each frequency block. A scheduler 43 has a function of performing frequency scheduling. The scheduler 43 receives uplink SINR information for each frequency block from the control-signal SINR calculating unit 41 or the dedicated-signal SINR calculating unit 42, and performs frequency scheduling of the uplink.

A subcarrier-arrangement-scheme selecting unit 44 is provided in the scheduler 43. When a distributed-subcarrier arrangement scheme is selected, the subcarrier-arrangementscheme selecting unit 44 regards the distributed-subcarrier arrangement scheme as the subcarrier arrangement scheme of a control signal or a dedicated signal that a mobile station is caused to transmit for uplink SINR measurement. Operations at SINR measurement by the base station apparatus according to the fourth embodiment are identical to those in the third embodiment.

Figure 9:
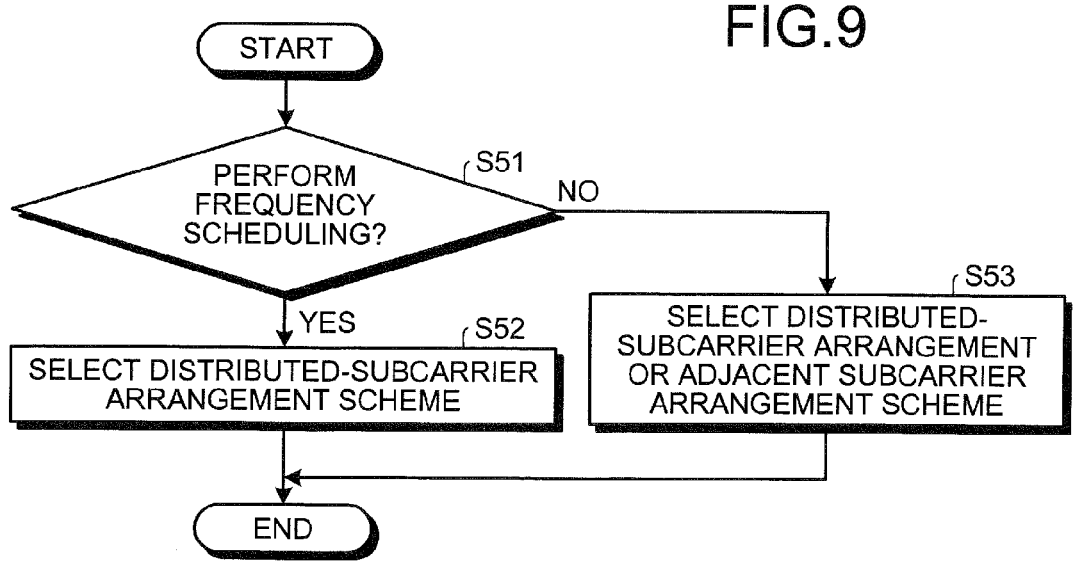
FIG. 9 is a flowchart of processing for selecting a subcarrier arrangement scheme executed by the base station apparatus according to the fourth embodiment.

FIG. 9 is a flowchart of processing for selecting a subcarrier arrangement scheme executed by the base station apparatus according to the fourth embodiment. As depicted in FIG. 9, when the processing of selecting a subcarrier arrangement scheme begins, the subcarrier-arrangement-scheme selecting unit 44 determines whether to perform frequency scheduling (step S51).

If frequency scheduling is to be performed (step S51: YES), the subcarrier-arrangement-scheme selecting unit 44 selects the distributed-subcarrier arrangement scheme (step S52). If frequency scheduling is not to be performed (step S51: NO), no particular processing is performed. Therefore, the subcarrier-arrangement-scheme selecting unit 44 selects the distributed-subcarrier arrangement scheme or an adjacent subcarrier arrangement according to the subcarrier arrangement scheme at the time of selection (step S53). Thus, the processing for selecting a subcarrier arrangement scheme ends.

As described, the fourth embodiment is achieved by adding the subcarrier-arrangement-scheme selecting function to the base station apparatus of the third embodiment. A function of selecting a subcarrier arrangement scheme similarly to the fourth embodiment can be added to the base station apparatus of the first embodiment or the second embodiment.

Figure 10:
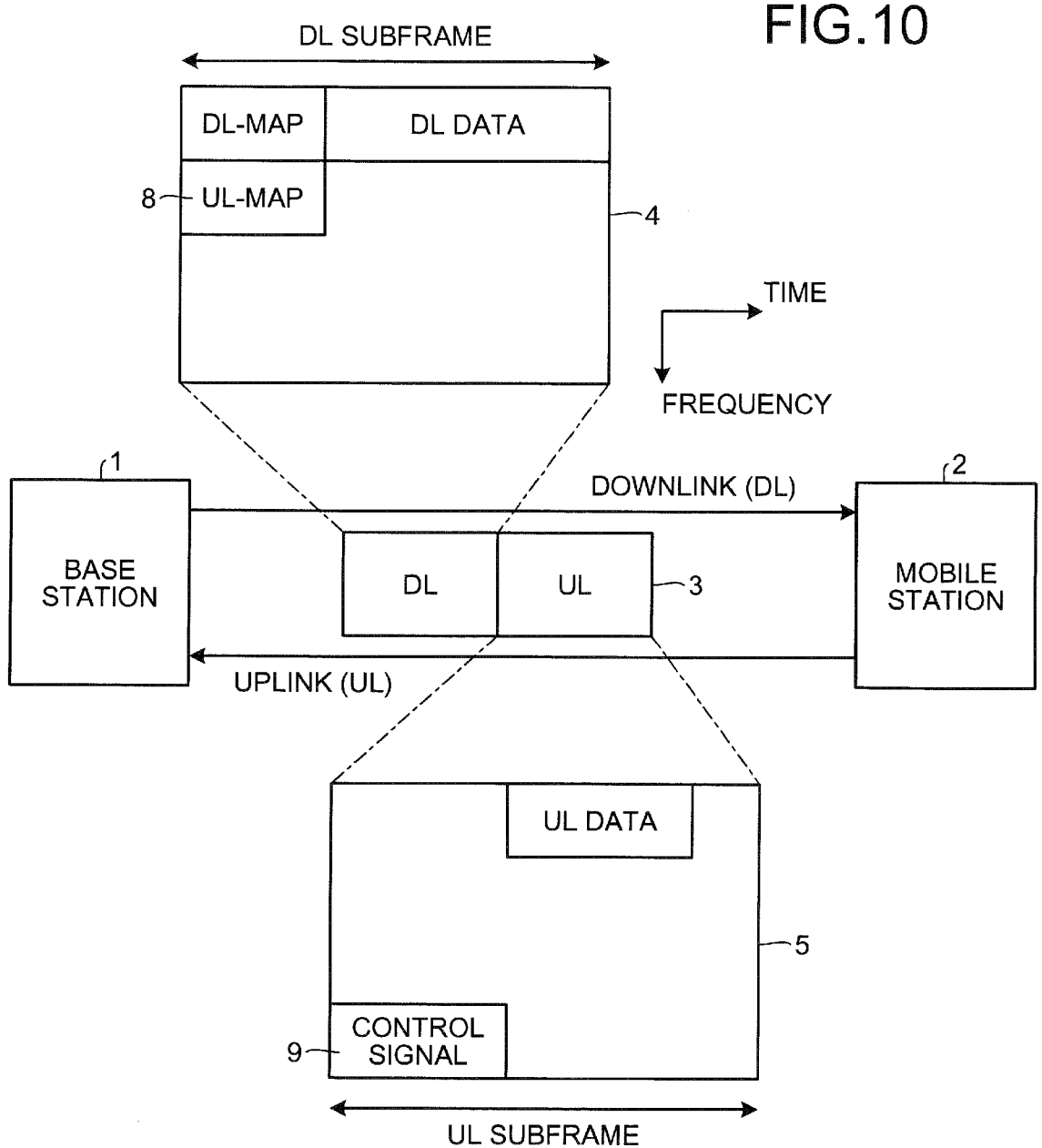
FIG. 10 is a schematic diagram for explaining an uplink SINR measuring method according to an embodiment of the present invention.

As described, according to the first to the fourth embodiments, when uplink SINR measurement is performed using a control signal, it is not necessary to perform both operations of giving, by a downlink, notification of wireless resources for uplink SINR measurement and transmitting, by an uplink, a dedicated signal for uplink SINR measurement. Therefore, as depicted in FIG. 10, the message size of uplink MAP information 8 in a downlink subframe 4 of a transmission/reception frame 3 for OFDMA is smaller than the message size of conventional uplink MAP information 6 depicted in FIG. 11. Moreover, in an uplink subframe 5, only a control signal area 9 is established as depicted in FIG. 10 and a conventional dedicated signal area 7 depicted in FIG. 11 is not required. Therefore, uplink SINR measurement and scheduling of the uplink can be performed without straining uplink and downlink resources.

FIG. 10 is a schematic diagram for explaining an uplink SINR measuring method according to an embodiment of the present invention. Furthermore, according to the third or the fourth embodiment, uplink SINR measurement can be performed using a dedicated signal for SINR measurement, and thus, uplink SINR information is assured to always be the most recent. Moreover, according to the fourth embodiment, when uplink SINR measurement is performed using a control signal in which subcarriers are distributed, SINR for all frequency blocks can be measured by performing SINR measurement for each subcarrier of the frequency blocks that are arranged in a single subchannel. Therefore, frequency scheduling can be performed, understanding SINR characteristics of the entire frequency range. Further, it is not necessary to send a subchannel for each of the frequency blocks and efficient utilization of wireless uplink resources is improved.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A base station apparatus comprising:
   a receiving unit that receives a control signal having predetermined patterns for performing communication control processing at the base station; and
   a measuring unit that measures SINR of reception data that is obtained from the control signal received by the receiving unit,
   wherein the measuring unit compares a demodulated signal that is obtained by demodulating the control signal received by the receiving unit and a signal obtained by encoding, by an encoding scheme identical to that for the control signal, decoded data that is obtained by decoding the demodulated signal and by mapping the encoded data into an IQ signal by a mapping scheme identical to that for the control signal, to calculate SINR.

2. The base station apparatus according to claim 1, wherein the receiving unit receives from a mobile station, a dedicated signal for SINR measurement, and
   the measuring unit includes a unit that measures SINR of a demodulated signal that is obtained by demodulating the dedicated signal received by the receiving unit, and that switches between SINR measurement using the control signal and SINR measurement using the dedicated signal according to availability of the control signal.

3. A base station apparatus comprising:
   a receiving unit that receives a control signal having predetermined patterns for performing communication control processing at the base station; and
   a measuring unit that measures SINR of reception data that is obtained from the control signal received by the receiving unit,
   wherein the measuring unit compares a demodulated signal that is obtained by demodulating the control signal received by the receiving unit with a plurality of known patterns, to calculate SINR, and selects the highest SINR from among the calculated SINR.

4. The base station apparatus according to claim 3, wherein the receiving unit receives from a mobile station, a dedicated signal for SINR measurement, and
   the measuring unit includes a unit that measures SINR of a demodulated signal that is obtained by demodulating the dedicated signal received by the receiving unit, and that switches between SINR measurement using the control signal and SINR measurement using the dedicated signal according to availability of the control signal.

5. An uplink SINR measuring method comprising:
   receiving a signal from a mobile station; and
   measuring SINR for reception data by using, among received signals, a control signal having limited given patterns for performing communication control processing at a base station, the reception data being obtained from the control signal,
   wherein the measuring includes obtaining a demodulated signal by demodulating the control signal, obtaining decoded data by decoding the demodulated signal, re-encoding the decoded data by an encoding scheme identical to that for the control signal, mapping the encoded data into an IQ signal by a mapping scheme identical to that for the control signal, and measuring SINR by comparing the demodulated signal and the mapping signal.

6. The uplink SINR measuring method according to claim 5, wherein the measuring further includes measuring SINR for a demodulated signal that is obtained by demodulating a dedicated signal for SINR measurement sent from the mobile station to the base station, when the received signal is a signal other than the control signal.

7. An uplink SINR measuring method comprising:
receiving a signal from a mobile station; and
measuring SINR for reception data by using, among received signals, a control signal having limited given patterns for performing communication control processing at a base station, the reception data being obtained from the control signal,
wherein the measuring includes obtaining a demodulated signal by demodulating the control signal, measuring respective SINR by comparing the demodulated signal with a plurality of known patterns, and selecting the highest SINR from among the respective SINR.

8. The uplink SINR measuring method according to claim 7, wherein the measuring further includes measuring SINR for a demodulated signal that is obtained by demodulating a dedicated signal for SINR measurement sent from the mobile station to the base station, when the received signal is a signal other than the control signal.

* * * * *